United States Patent [19]

Manabe et al.

[11] Patent Number: 4,836,901

[45] Date of Patent: Jun. 6, 1989

[54] CORONA DISCHARGE TREATING METHOD AND APPARATUS FOR RESIN MOLDINGS

[75] Inventors: Katsuhide Manabe; Yasuhiko Ogisu; Kazuaki Goto; Hisao Toya, all of Aichi, Japan

[73] Assignee: Toyoda Gosei Co., Ltd., Nishikasugai, Japan

[21] Appl. No.: 163,205

[22] Filed: Feb. 26, 1988

Related U.S. Application Data

[63] Continuation of Ser. No. 903,619, Sep. 5, 1986, abandoned.

[30] Foreign Application Priority Data

Sep. 5, 1985 [JP] Japan .................................. 60-196449
Jan. 31, 1986 [JP] Japan .................................. 61-20461

[51] Int. Cl.$^4$ ........................ H01T 19/04; B29C 35/00
[52] U.S. Cl. ..................................... 204/164; 264/26; 264/27; 250/326
[58] Field of Search ................. 204/164, 165; 250/324, 250/325, 326; 264/26–27

[56] References Cited

U.S. PATENT DOCUMENTS

| | | | |
|---|---|---|---|
| 3,783,283 | 1/1974 | Smith, Jr. .............................. | 250/324 |
| 3,888,753 | 6/1975 | Kiikka et al. ......................... | 204/165 |
| 4,118,624 | 10/1978 | Luckan et al. ....................... | 250/324 |
| 4,322,156 | 3/1982 | Kohyama ............................. | 250/324 |
| 4,467,200 | 8/1984 | Kalwar et al. ....................... | 250/324 |
| 4,572,772 | 2/1986 | Peterson .............................. | 204/164 |

Primary Examiner—John F. Niebling
Assistant Examiner—Ben C. Hsing
Attorney, Agent, or Firm—Cushman, Darby & Cushman

[57] ABSTRACT

Disclosed is a corona discharge treating method and apparatus for a three-dimensional resin molding having corners, in which a corona discharge electrode at least having a curved surface discharge portion is relatively moved along the shape of the surface of the molding with corona discharge generated in the vicinity of the molding.

21 Claims, 8 Drawing Sheets

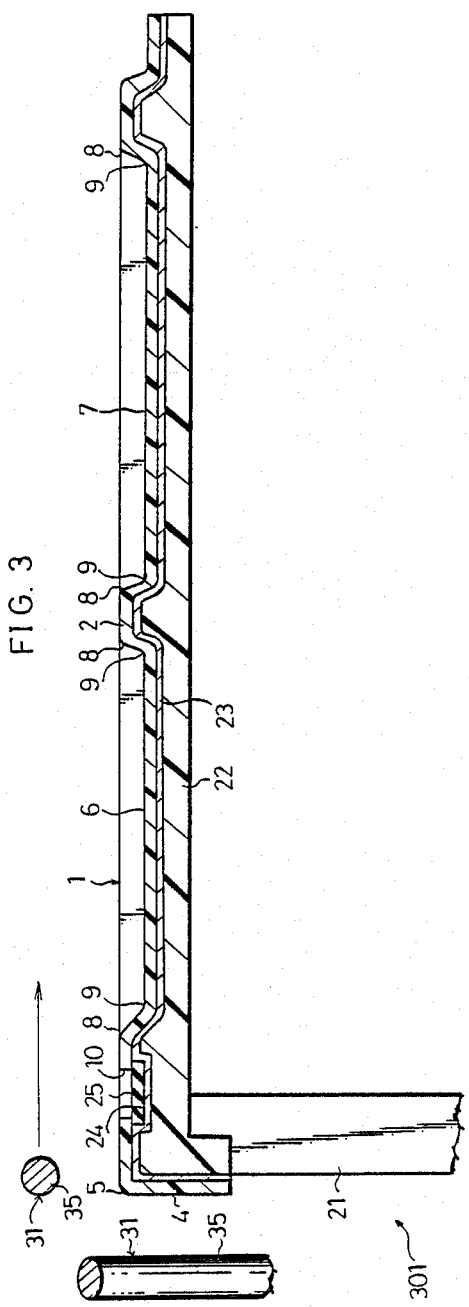
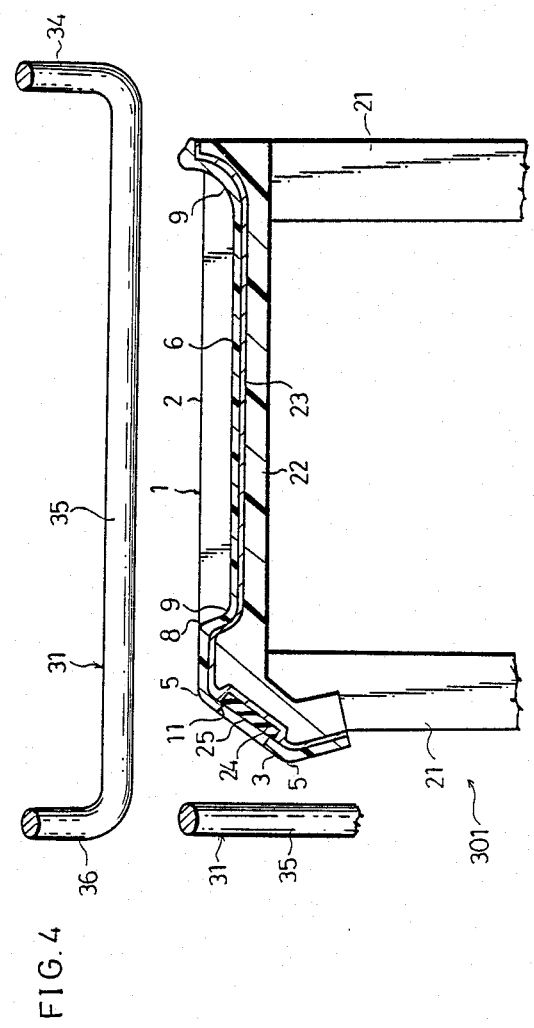

CORONA DISCHARGE TREATING METHOD AND APPARATUS FOR RESIN MOLDINGS

This is a continuation of application Ser. No. 903,619, filed Sept. 5, 1986, which was abandoned upon the filing hereof.

BACKGROUND OF THE INVENTION

1. Field of the Invention.

The present invention relates to a corona discharge treating method and apparatus for improving the quality of surfaces of resin moldings, and more particularly, relates to a corona discharge treating method and apparatus for three-dimensional resin moldings having corners.

2. Description of the Related Art

Generally, polyolefin-series resin such as polypropylene or the like has such a property that painting materials, joining materials, printing materials or the like are hardly adhered onto the surface thereof, because the resin has a little number of polar groups. Accordingly, in the case where painting, joining, printing or the like, is applied to the surface of the resin, the quality of the surface should be improved by pretreatment in order to improve the adhesive property thereof.

Various methods, such as flame treatment, acid solution treatment, plasma treatment, corona discharge treatment and the like, are used as pretreatment for improving the adhesive property of the polyolefin-series resin with respect to painting materials, joining materials, printing materials or the like.

The plasma treatment is a useful method for activating the almost whole surface of a resin molding at once, and accordingly, the plasma treatment has produced excellent results as pretreatment before painting or joining treatment for automobile bumpers, automobile moldings, etc.

However, plasma treatment requires a reduced-pressure plasma gas atmosphere. Accordingly, plasma treatment has a disadvantage that large-scale and high-cost equipments, such as a vacuum tank, a vacuum pump, a valve mechanism, a carrier gas and the like, are required as well as a large time is required to reduce pressure within the vacuum tank. Furthermore, in plasma treatment, manufacturing processes should be made by batch processing, so that automatization thereof is difficult. Accordingly, plasma treatment has another disadvantage that the vacuum condition is interrupted for each manufacturing process to thereby require a long time for next reduction of pressure.

From this point of view, corona discharge treatment which does not require such equipments as a vacuum tank and the like, is very advantageous. Corona discharge treatment, however, suffers from the limitation that a discharge electrode should be always close to a surface to be treated. Accordingly, corona discharge treatment has been used only for film-like or plate-like resin moldings (hereafter generically referred to as two-dimensional resin moldings). There is no report or reference that suggests use of corona discharge treatment for resin moldings having three-dimensionally uneven surfaces to be treated (hereafter generically referred to as three-dimensional resin moldings).

It is to be understood that realization of corona discharge treatment for three-dimensional resin moldings produces a large advantage in the cost of equipment and the time required for the treatment. For the realization, however, several problems should be solved. One of the problems is the lack of uniformity in the state of improved quality. Because the surface of a three-dimensional resin molding to be treated is rough, the distance between the corona discharge electrode and the surface is changed. The power of discharge becomes higher as this distance decreases, while the power of discharge becomes lower as this distance increases. Accordingly, there is a possibility of producing the lack of uniformity in improved quality depending on the positions of the treated surface.

SUMMARY OF THE INVENTION

An object of the present invention is to provide a corona discharge treating method and apparatus for a three-dimensional resin molding having corners, which can improve the adhesive property of the surface thereof with respect to painting materials, joining materials, printing materials, or the like; which can save the cost and space of equipment required to thereby shorten processing time; and which can steadily treat the corners making corona discharge treatment difficult.

Another object of the present invention is to provide a corona discharge treating method and apparatus for a resin molding, which can improve processing efficiency to thereby shorten processing time.

A further object of the present invention is to provide a corona discharge treating method and apparatus for a resin molding, which can eliminate a difficult problem in the lack of uniformity in improved quality to thereby realize corona discharge treatment for a three-dimensional molding; and accordingly can improve the quality of the treated surface totally and uniformly.

To attain the foregoing objects, according to the present invention, a corona discharge electrode at least having a curved surface discharge portion is moved relatively along the shape of the surface of a three-dimensional resin molding with corona discharge generated in the vicinity of the molding.

Other objects of the present invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWING

FIG. 2 to FIG. 7 show a first embodiment, FIG. 2 is a perspective view of a corona discharge treating apparatus with an instrument panel pad, FIG. 3 is a longitudinal sectional view of an instrument panel pad, FIG. 4 is a transverse sectional view of an instrument panel pad under a corona discharge treating by use of a discharge electrode having a rod-like discharge portion, FIG. 5 is a transverse sectional view of an instrument panel pad under a corona discharge treating by use of a discharge electrode having a spherical discharge portion in a first embodiment, FIG. 6 is a schematic view of a discharge electrode having a rod-like portion connected with a higefrequency energy applying means, FIG. 7 is a schematic view of a discharge electrode having a spherical discharge portion connected with a hige-frequency energy applying means, FIG. 8 is a front view of a corona discharge treating apparatus, FIG. 9 is a block diagram of a hige-frequency energy applying means and electrodes, FIG. 10 is a transverse sectional view of an instrument panel pad mounted on a counter electrode means, FIG. 11 is a right side view of a corona discharge treating apparatus, FIG. 12 is a plan view of a Y-direction moving means, FIG. 13 is a longitudinal sectional view of an instrument panel pad mounted on a counter electrode means with a moving manner of a discharge electrode.

DETAILED DESCRIPTION OF THE PREFERRED EMBODIMENTS (First Embodiment)

A first embodiment of the present invention will be described hereunder with reference to FIGS. 1 to 7.

Figure 1:
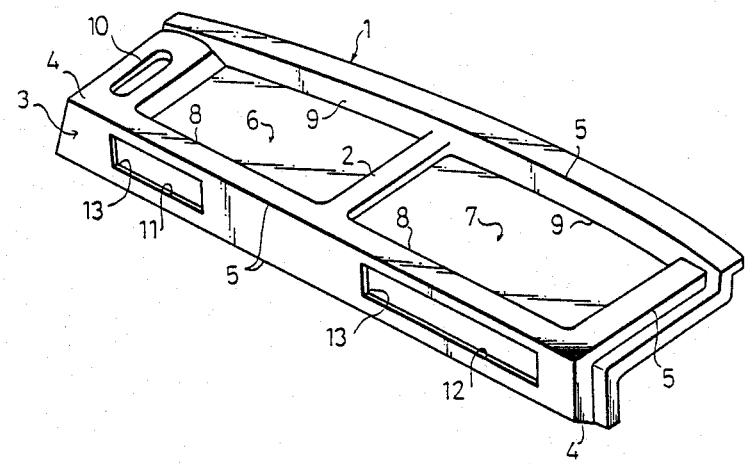
FIG. 1 is a perspective view of an instrument panel pad of the present invention.

The term "three-dimensional resin molding" used in this specification means a three-dimensionally uneven resin molding which is not a flat resin molding such as a resin sheet, a resin flat board, or the like. In this embodiment, the three-dimensional resin molding to be processed by corona discharge is an automobile instrument panel pad 1 formed of PP resin as shown in FIG. 1. An outer sheet made of polyvinyl chloride resin is stuck to the surface of the instrument panel pad 1 to thereby form an instrument panel pad article.

The instrument panel pad 1 has convex corners 5 with about a 6 mm radius on the border between the upper surface 2 and front surface 3, the border between the upper surface 2 and the side surface 4, or the like.

Figure 2:
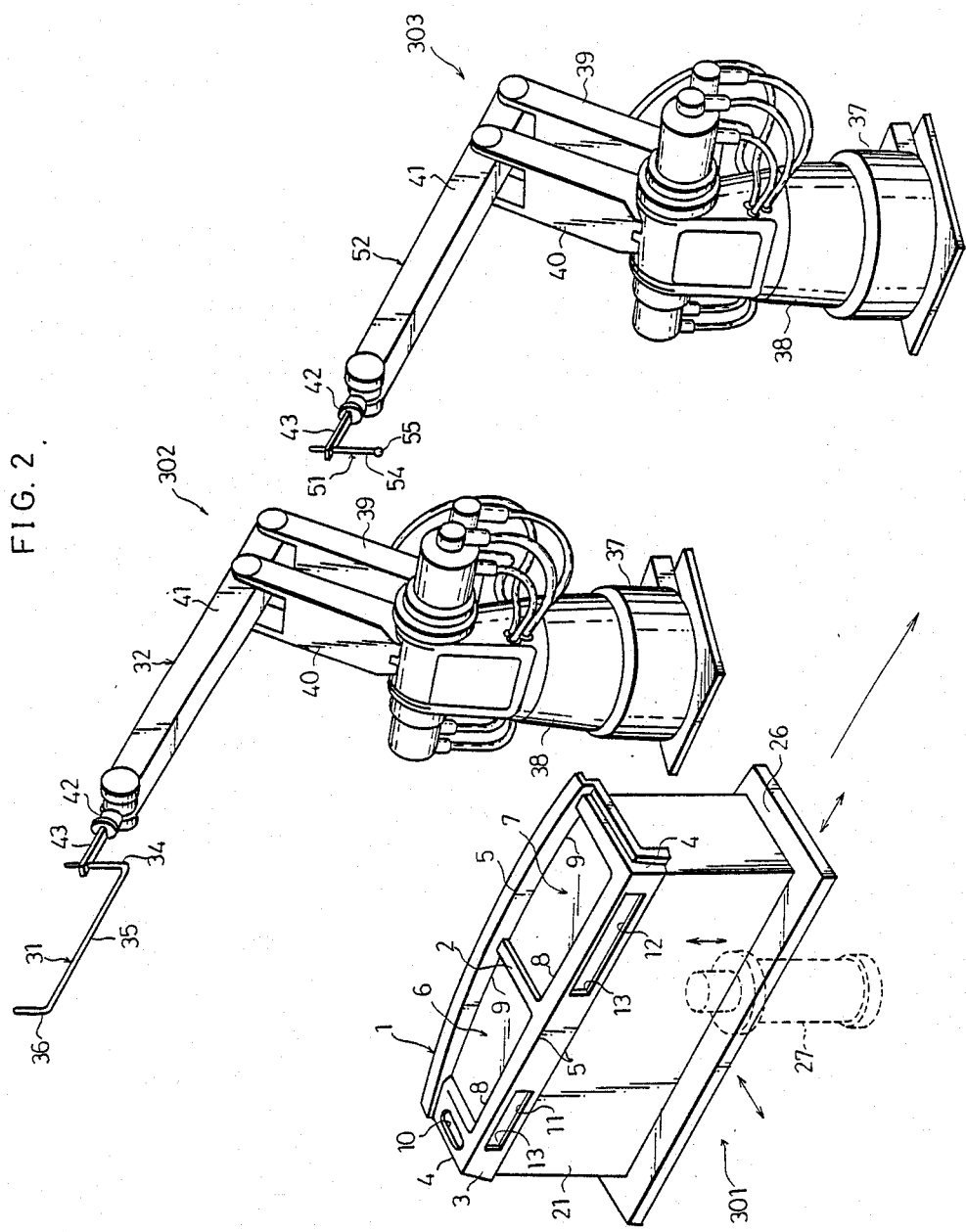
Figure 6:
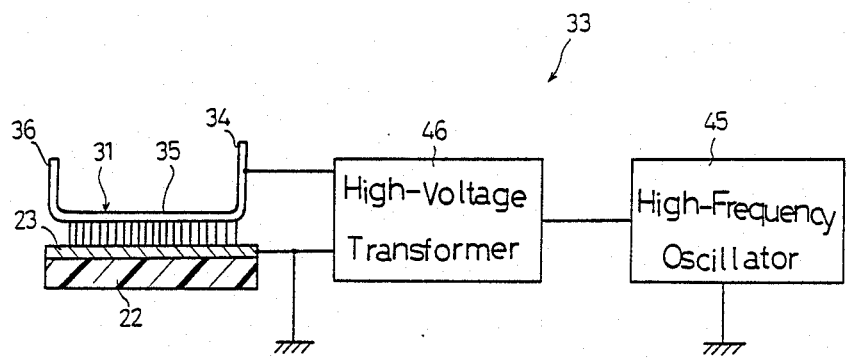

On the left and right sides of the upper surface 2 of the instrument panel pad, two shallow saucers 6 and 7 are provided. Accordingly, as shown in FIG. 2, convex corners 8 are at the upper edges of the saucers 6 and 7, and concave corners 9 are at the bottom edges of the saucers 6 and 7, respectively. The respective corners 8 and 9 have a radius of about 6 mm. An air-blowing port 10 for side-defroster is formed at the left end of the upper surface 2, and two air-blowing ports 11 and 12 for ventilation and air-conditioning are formed at the left and right sides of the front surface 3, respectively. Each of the air-blowing ports 10, 11 and 12 is shaped approximately like a quadrangle and has corners 13 with a radius of from 6 to 15 mm at its edges and four corners.

As described above, the instrument panel pad 1 is featured in that it is a three-dimensional molding and that it has a lot of corners 5, 8, 9 and 13.

An apparatus for applying corona discharge treatment to the instrument panel pad 1 will be now described hereunder.

The corona discharge treating apparatus of first embodiment, as shown in FIG. 2, mainly comprises a jig member 301 (including a moving mechanism for the jig member 301, and a counter electrode) for fixing the instrument panel pad 1, a first treating unit 302 (disposed to the left side in FIG. 2) for treating the instrument panel pad 1 with corona discharge through a discharge electrode having a rod-like discharge portion, and a second treating unit 303 (disposed to the right side in FIG. 2) for treating the instrument panel pad 1 with corona discharge through a discharge electrode at least having a curved surface at the top thereof.

The parts 301 to 303 will be described in detail and in order hereunder.

[Jig Member 301]

The jig member 301 has a base leg 21 which can be suitably moved back and forth and right and left on a floor by sliding means 26 (which can be general means such as a rail, a roller, etc.) provided on the floor and can be suitably moved up and down by a hydraulic cylinder 27 provided under the base leg 21.

As shown in FIGS. 3 and 4, a jig body 22 formed from epoxy resin so as to agree with the inside shape of the instrument panel pad 1 is mounted onto the base leg 21 to thereby support the instrument panel pad 1 from the inside thereof. The jig body 22 can be easily formed like a shell by reactively hardening epoxy resin poured to the inside of the instrument panel pad 1.

A counter electrode 23 for corona discharge treatment is formed on the surface of the jig body 22 by any one of coating methods, such as a metal plating method, a vacuum evaporating method, a sputtering method, a conductive paint coating method, an aluminum foil sticking method, etc. The surface of the counter electrode 23 is made to substantially abut on the inner surface of the instrument panel pad 1.

The jig body 22 is provided with about 6 mm deep recess portions 24 formed at the positions corresponding to the air-blowing ports 10, 11 and 12 of the instrument panel pad 1. For generating uniform corona discharge, the counter electrode 23 is formed on the surfaces of the recess portions 24 and about 6 mm thick buffering plates 25 formed of a dielectric material, such as hyperon rubber, epoxy resin, or the like, are inserted into the recess portions 24. If the counter electrode 23 is directly formed at a position on the jig body 22 corresponding to the airblowing ports which are throughholes, the counter electrode 23 will be exposed with respect to a discharge electrode to be described later to thereby disturb corona discharge.

[First Treating Unit 302]

The first treating unit 302 comprises a discharge electrode 31 having a rod-like discharge portion, a moving mechanism 32 for moving the discharge electrode 31 to cause it approach the instrument panel pad 1 and for further moving the discharge electrode 31 along the respective surfaces of the instrument panel pad 1, and high-frequency energy applying means 33 for applying high frequency energy to the counter electrode 23 and the discharge electrode 31 to thereby generate corona discharge.

The discharge electrode 31 disposed in the air is formed by bending a stainless steel bar of a diameter of 14 mm into a U-shape. The discharge electrode 31 is constituted by three portions of: (1) a gripped portion 34 gripped by the moving mechanism 32; (2) a rod-like discharge portion 35 substantially parallel to the instrument panel pad 1; and (3) a terminal portion 36 for preventing the concentration of corona discharge onto the end of the discharge portion 35 to produce corona discharge uniformly at the whole of the discharge portion 35; the three portions being at right angles to each other in order from the base end thereof.

The radius of the discharge electrode 31 is 7 mm which is larger than the radius (6 mm) of each of the main corners 5, 8 and 9 in the instrument panel pad 1.

A computer controlled robot is used in the moving mechanism 32 and various types of industrial robots (e.g., multipurpose working robot, Model: PW-10II, HITACHI Ltd.) are applicable thereto. In the first embodiment, the moving mechanism 32 is of the articulated or revolute type and constructed as follows. A support base 38 is rotatably pivoted on the upper portion of a base leg 37, and first and second arms 39 and 40 are independently rotatably pivoted to the upper portion of the support base 38.

On the upper portions of the two arms 39 and 40, a third arm is rotatably pivoted at its base end. A cylindrical acting portion 42 is rotatably pivoted on the top end of the third arm 41. The acting portion 42 is formed so as to rotate about its central axis, and a gripping member 43 for gripping the gripped portion 34 of the discharge electrode 31 is attached to the top end of the acting portion 42.

All the operations, such as rotation of the support base 38, motion of each of the arms 39 to 41, rotation of the acting portion 42, and the like, are controlled by a computer not shown. Through the operations by executing a computer program, the electrode 31 is caused to approach the instrument panel pad 1 up to a distance of about 10 mm toward each of the upper surface 2, the front surface 3 and the side surfaces 4 of the instrument panel pad 1 and then to move along each of these surfaces.

The counter electrode 23 of the jig member 301 and the rod-like discharge electrode 31 are connected to high-frequency energy applying means 33 constituted by a high-frequency oscillator 45 and a high-voltage transformer 46. The counter electrode 23 is grounded. As a measure to counter high-frequency noises, the high-frequency oscillator 45 is also directly grounded.

As the high-frequency oscillator 45, used is a product made by Tantec (trade name HVO5-2), for generating high frequency energy of 20-30 kHz and 350 W maximum power output. As the highvoltage transformer 46, used is a product made by Tantec (trade name SUPER C), for raising the high-frequency output voltage of the high-frequency oscillator 45 to impress a high voltage onto the electrodes 23 and 31.

The high-frequency energy applying means 33 and the computer control mechanism of the moving mechanism 32 are disposed at a considerable distance from each other and are independently energized by separate power sources for the purpose of preventing operation errors of the computer owing to high-frequency noises leaking out of the high-frequency applying means 33. Further, for the same purpose, it is necessary to securely shield cords for connecting the high-frequency oscillator 45, the high-voltage transformer 46 and the discharge electrode 31.

[Second Treating Unit 303]

The second treating unit 303 is constituted by a discharge electrode 51 having a spherical discharge top end portion, a moving mechanism 52 for moving the discharge electrode 51 to approach the instrument panel pad 1 and for further moving the discharge electrode 51 three-dimensionally along the shape of the instrument panel pad 1, and high-frequency energy applying means 53 for applying high frequency energy to the counter electrode 23 and the discharge electrode 51 to thereby generate corona discharage.

The discharge electrode 51 disposed in the air is constituted by a rod-like gripped portion 54 of a diameter of about 2 mm formed of stainless steel to be gripped by the moving mechanism 52, and a spherical discharge portion 55 formed of stainless steel and attached to the top end of the gripped portion 54 to substantially perpendicularly correspond to the instrument panel pad 1.

The radius of the spherical discharge portion 55 is 2.5 mm which is smaller than the radius (6–15 mm) at each of the corners 5, 8, 9 and 13 of the instrument panel pad 1. Accordingly, corona discharge from the discharge portion 55 is made densely with respect to each of the corners 5, 8, 9 and 13.

Figure 7:
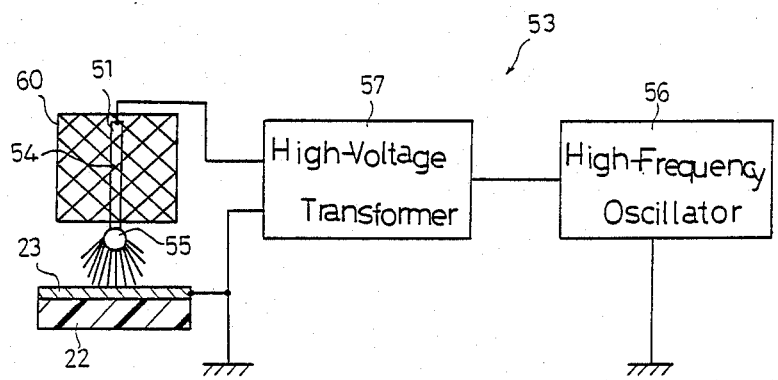

Preferably, a mesh-like shielding cylinder 60 formed of stainless steel or the like is provided around the discharge electrode 51 as shown in FIG. 7 for the purpose of preventing radiation of high-frequency noises generated from the discharge electrode 51 during corona discharge.

The same structure as used for the moving mechanism 32 of the first treating unit 302 is used for the moving mechanism 52.

Accordingly, operations, such as rotation of the support base 38, motion of each of the arms 39 to 41, rotation of the acting portion 42, and the like, are made with the execution of a program on a computer not shown, so that the discharge 51 is caused to approach the instrument panel pad 1 up to a distance of about 10 mm substantially perpendicularly to the cut surface of each of the corners 5, 8, 9 and 13 and the air-blowing ports 10, 11 and 12 of the instrument panel pad 1 and then to move three-dimensionally along the shape of each of the cut surfaces.

The counter electrode 23 of the jig member 301 and the discharge electrode 51 having a spherical discharge top end are connected to high-frequency energy applying means 53 constituted by a high-frequency oscillator 56 and a high-voltage transformer 57, as shown in FIG. 7. The same products as used in the first treating unit 302 are used for the high-frequency oscillator 56 and the high-voltage transformer 57.

Description will now be made as to a method for applying corona discharge treatment to the instrument panel pad 1 by use of the corona discharge treating apparatus having such a construction as described above.

First, in the case where the molded instrument panel pad 1 is stained with parting agents or owing to handwork, preferably the stain is removed by pretreatment with trichloroethane or the like for the purpose of surely performing corona discharge treatment. However, in the case where it is little stained with parting agents or owing to handwork, such pretreatment is of course unnecessary.

Next, the instrument panel pad 1 is fitted to the jig body 22 of the jig member 301 as shown in FIGS. 3 and 4 so that contact is made between the surface of the counter electrode 23 and the inner surface of the instrument panel pad 1. In this case, although there may occur portions of the instrument panel pad which are not in contact with the counter electrode 23 due to manufacturing errors of the instrument panel pad 1, the corona discharge is not so affected as long as the distance therebetween at those non-contact portions is within about 2 to 3 mm. The jig member 301 is moved to the front of the first treating unit 302 by the sliding means 26.

Next, the main portions of the instrument panel pad 1 are treated with corona discharge by the first treating unit 302. Upon actuation of the moving mechanism 32, the discharge portion 35 of the rod-like discharge electrode 31 is arranged to extend in the frontward/rearward direction over the upper surface 2 of the instrument panel pad 1 as shown in FIG. 4 and is disposed about the left end of the upper surface 2 at a distance of about 10 mm, as shown in FIG. 3.

At this time, the high-frequency oscillator 45 of the high-frequency energy applying means 33 is actuated to operate, the high-frequency output voltage thereof is raised by the high-voltage transformer 46 so that high-frequency energy of 28 kV is impressed across the counter electrode 23 and the rod-like discharge electrode 31. Upon the impression of high frequency energy, corona discharge occurs in the air between the upper portion 2 and a portion of the discharge portion 35 opposite to the upper surface 2, so that corona discharge treatment for the upper surface 2 starts to thereby improve the adhesive property with respect to an adhesive agent, or the like. Improvement of wetting property owing to the corona discharge treatment of the first embodiment is substantially the same as that owing to a frame treatment.

The phenomenon in the corona discharge treatment is considered to be induced by the fact that a flow of electrons generated by discharge collide with synthetic resin (which is PP in the first embodiment) so that the collision energy thereof partially breaks carbon-hydrogen bonds to activate the surface of the synthetic resin with oxidation and ionization.

The rod-like discharge electrode 31 is gradually moved to the right of the upper surface 2 by the moving mechanism 32, while generating the corona discharge. The moving speed can be suitably set within a range of 1 to 250 mm/sec under the above-described discharge conditions. In the first embodiment, the moving speed is set to be 150 mm/sec, on the balance of satisfactory results with shortening of necessary time for the treatment.

Although the bulk of the upper surface 2 can be treated with corona discharge with the movement of the discharge electrode 31, positions, such as the corners 5 of the upper surface 2, the cut end surfaces and corners 13 of the air-blowing ports 10, 11 and 12, the corners 8 and 9 of the saucers 6 and 7, and the like, are difficult to be treated. It is considered that potential distribution changes at these positions to make the surface to be treated out of perpendicular to the direction of discharge, so that corona discharge is pulled to the surface other than these positions and does not act on these positions effectively.

If the discharge electrode 31 would come into direct opposition to the counter electrode 23 when the electrode 31 passes above of the air-blowing port 10, severe discharge would occur to therefore result in defective articles. However, according to the first embodiment, the buffering plates 25 of a dielectric material are interposed as described above to thereby make the discharge relaxed and uniform. In the other positions of the upper surface 2, the instrument panel pad 1 itself is a dielectric functioning as a buffering member, so that uniform discharge occurs.

If a buffering member of a dielectric material would be provided wholly on the inside of the instrument panel pad 1, corona discharge would become uniform but would become weak all over the surfaces of the instrument panel pad 1 to thereby reduce the treating efficiency. However, in the first embodiment, the buffering plates 25 are provided only at the insides of the air-blowing ports 10-12 which are through-holes.

After the completion of the corona discharge treatment for the upper surface 2 in such a manner as described above, the discharge electrode 31 is automatically moved by the moving mechanism 32 so as to be arranged to extend vertically (in the up/down direction) in the vicinity of the front surface 3 of the instrument panel pad 1 as shown in FIG. 4. In succession, the discharge electrode 31 is moved from the left end front portion of the front surface 3 to the right end front portion of the same, (keeping at a distance of about 10 mm similar to that in the case of the upper surface 2) while maintaining the corona discharge. Thus, corona discharge treatment for the front surface 3 is perfected.

Similarly to the case of the air-blowing port 10, the cut end surfaces and the corners 13 of the air-blowing ports 11 and 12 are difficult to be treated and corona discharge is kept uniform under the influence of the buffering plates 25 when the discharge electrode 31 passes the front of the air-blowing ports 11 and 12.

After the completion of the corona discharge treatment for the front surface 3, the discharge electrode 31 is automatically moved by the moving mechanism 32 so as to be arranged to extend vertically (in the up/down direction) in the vicinity of the side surface 4 of the instrument panel pad 1 as shown in FIG. 3. In succession, the discharge electrode 31 is moved from the side of the rear end of the side surface 4 to the side of the front end of the same. Thus, corona discharge treatment for the side surfaces 4 is perfected.

The total time required for the corona discharge treatment for the upper surface 2, the front surface 3 and the opposite side surfaces 4 by means of the first treating unit 302 is about 25 sec.

Although the above-described treatment shows the case where the discharge electrode 31 is moved relative to the instrument panel pad 1 only by the moving mechanism 32, only the instrument panel pad 1 may be moved by both the sliding means 26 and the hydraulic cylinder 27 or both the discharge electrode 31 and the instrument panel pad 1 may be moved.

As described above, according to the first treating unit 302, large-scale equipment, such as a vacuum tank, a vacuum pump, a valve mechanism, a carrier gas and the like, and preparatory time to be reduce pressure within the vacuum tank, as required in the plasma treatment, becomes unnecessary. Furthermore, it is made possible to improve the quality of the surface of the PP resin only by moving corona discharge generated in the air by the rod-like discharge electrode 31 or the like. Accordingly, it is possible to save the cost and space of equipment greatly as well as to shorten the time required for the treatment.

In addition, because the rod-like discharge electrode 31 is moved along the surface of the instrument panel pad 1, a wide surface to be treated can be treated at once to make treating efficiency very high.

After the corona discharge treatment according to the first treating unit is perfected, the high-frequency oscillator 45 is turned off to stop the corona discharge, and the jig member 301, together with the instrument panel pad 1, is moved to the front of the second treating unit 303 by the sliding means 26.

In succession, the corners 5, 8, 9 and 13 and the like not fully treated with corona discharge by the first treating unit 302 can be treated by the second treating unit 303. The moving mechanism 52 is operated and the spherical discharge portion 55 of the discharge electrode 51 is disposed at a distance of about 10 mm with respect to the corners 5 of the instrument panel pad 1 as shown in FIG. 5.

At this time, the high-frequency oscillator 56 of the high-frequency energy applying means 53 is operated and high frequency energy of 28 kV is impressed across the counter electrode 23 and the discharge electrode 51 so that corona discharge is generated between the discharge portion 55 and the corners 5.

Figure 5:
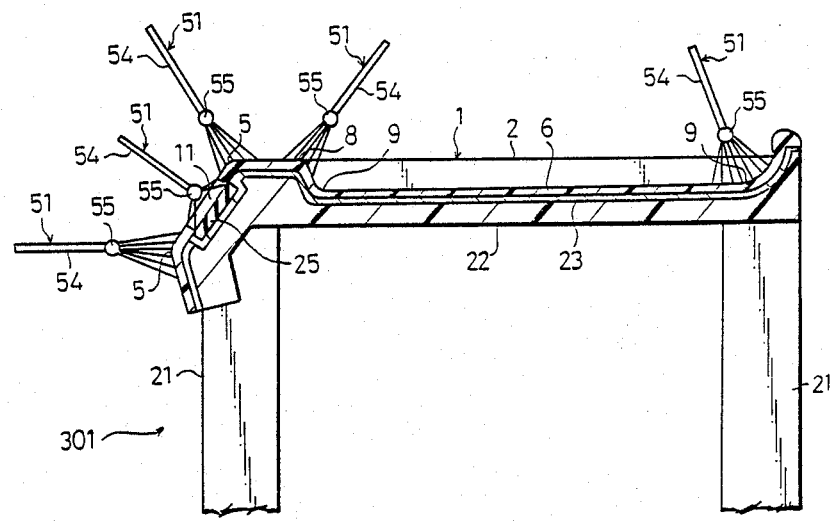

The corona discharge generated from the discharge portion 55 has a very uniform discharge pattern as shown in FIG. 5, and accordingly, the surface treatment for the instrument panel pad 1 at a time is of a relatively wide range and a range within a circle of a diameter of 10–15 mm can be treated sufficiently. This is because the discharge portion 55 is spherical and hence the discharge top end is shaped to be a curved surface so that corona discharge is uniformly distributed without concentration onto one point (such as a sharp point, a corner point, or the like).

Furthermore, because the discharge top end is shaped to be a curved surface, the corona discharge is little influenced by the changes in potential distribution at the corners 5 or the angles of the surface to be treated with respect to the direction of discharge and, accordingly, the corona discharge effectively acts on the corners 5. Particularly, because the radius of the discharge portion 55 in the discharge electrode 51 of this embodiment is smaller than the radius at each of the corners 5, 8, 9 and 13, the above-described influences are negligible. Accordingly, the corners 5 not fully treated by the first treating unit 302 can be fully treated herein.

The discharge electrode 51 is gradually moved three-dimensionally over all the corners 5 by the moving mechanism 52, while generating corona discharge. The moving speed can be suitably set to be a value within a range of 1 to 250 mm/sec under the above-described discharge conditions. In the first embodiment, the moving speed is set to be 150 mm/sec, on the balance of satisfactory results with the shortening of necessary time for the treatment.

After the completion of treatment for the corners 5, the discharge electrode 51 is automatically moved above the respective corners 8 and 9 of the saucers 6 and 7 by the moving mechanism 52 and treats the corners 8 and 9 while three-dimensionally moving. After the treatment for the corners 8 and 9, the discharge electrode 51 is similarly moved to the air-blowing ports 10, 11 and 12 in order and treats the cut end surfaces and corners 13 of the ports.

The total time required for the corona discharge treatment for the corners and the like according to the second treating unit 303 is about 30 sec. After the treatment is completed, the corona discharge stops.

Although the above-described treatment shows the case where the discharge electrode 51 is moved relative to the instrument panel pad 1 only by the moving mechanism 52, only the instrument panel pad 1 may be moved by both the sliding means 26 and the hydraulic cylinder 27 or both the discharge electrode 51 and the instrument panel pad 1 may be moved. In the case where the instrument panel pad 1 is moved, it is preferable to form the instrument panel pad 1 to be slantingly movable so as to make it possible to adjustably change the angle between the discharge electrode 51 and the surface to be treated.

As described above, according to the second treating unit 303, similarly to the first treating unit 302, improvement in quality of the surface of the PP resin instrument panel pad 1 can be made only by moving the discharge electrode 51 or the like with corona discharge generated in the air. Accordingly, it is possible to save the cost and space of equipment greatly as well as to shorten the time required for the treatment.

Furthermore, because the discharge electrode 51 at least having a curved surface discharge top end is moved along the surface of the instrument panel pad 1, the corners 5, 8, 9 and 13 difficult to be treated by the rod-like electrode 31 can be surely treated.

As described above, according to the first embodiment, because short-time treatment for the main portions of the instrument panel pad 1 by the first treating unit 302 is combined with treatment for the corners 5, 8, 9 and 13 of the instrument panel pad 1 by the second treating unit 303, it is possible to improve treating efficiency greatly as a whole and shorten treating time greatly.

It is to be understood that the first embodiment is not limited to the above-described specific construction, and that changes or modifications may be made as follows.

(1) Generally, in order to generate corona discharge, a high-frequency voltage or a high voltage is impressed between two adjacent electrodes (for example, the counter electrode 23 and the discharge electrode 31/51), as described in the foregoing embodiment.

However, by use of atmospheric electricity, corona discharge can be generated from only a discharge electrode without use of a counter electrode. Particularly, in the case of the discharge electrode 51 having a spherical discharge portion 55 at the top end, relatively strong and uniform corona discharge can be generated without use of the counter electrode 23 because the corona discharge concentrates onto the sphere portion thereof.

Accordingly, a treating method without use of the counter electrode 23 is applicable to the second treating unit 303, though the use of the counter electrode 23 contributes to strengthening discharge and enlarging discharge range.

(2) The treating procedure according to the first treating unit 302 and the treating procedure according to the second treating unit 303 may be made in reverse order, or either or both may be repeated twice or more or may be suitably combined.

(3) The whole surface of the instrument panel pad can be treated by use of only the second treating unit 303, though combination with the first treating unit 302 makes treating time short because the plane portions of the instrument panel pad 1 are treated more efficiently by use of the rod-like discharge electrode 31.

(4) Preferably, the jig member 301 and the units 302 and 303 are installed in a room maintained at constant temperature and humidity, because corona discharge is affected by ambient temperature and humidity.

(5) Either the high-frequency energy applying means 33 of the first treating unit 302 or the high-frequency energy applying means 53 of the second treating unit 303 may be used in common to serve a double purpose.

In this case, the cost of equipment can be more reduced but the conditions for corona discharge in the discharge electrodes 31 and 51 cannot be set independently and freely.

(6) The discharge portion 55 of the discharge electrode 51 is not limited to the spherical shape, but any shape, for example, a hemispherical one or a spheroidal one, can be employed as long as at least the discharge top end is shaped to be a curved surface.

However, it is considered that the spherical shape is optimum from the point of view of uniformity of corona discharge.

(7) The rod-like discharge electrode 31 can be replaced by a plane-like discharge electrode which is moved to approach to the instrument panel pad 1 by the moving mechanism 32.

(Second Embodiment)

A second embodiment of the present invention will be described hereunder with reference to FIGS. 8 to 13. The resin molding used in the second embodiment is the same as that used in the first embodiment.

The corona discharge treating apparatus of the second embodiment, which is provided on a base rack 80 formed of a two-stage metal framing, mainly comprises:

(1) counter electrode means 401 disposed at the first stage of the base rack 80 for fixing the instrument panel pad 1 and bring a counter electrode into contact with the rear surface thereof;

(2) a discharge electrode 90 and moving means 402 disposed at the second stage of the base rack 80 for moving the discharge electrode 90 and the instrument panel pad 1 relative to each other while maintaining the distance between the discharge electrode 90 and the surface of the instrument panel pad 1 to be treated substantially constant;

(3) high-frequency energy applying means 403 disposed on a shelf 84 at the left side of the base rack 80 for applying high-frequency energy to the discharge electrode 90 and having discharge power output control means for maintaining discharge power output constant in spite of the changes in distance between the surface of the instrument panel pad 1 to be treated and the discharge electrode 90; and (4) a control unit 404 disposed at the right side of the base rack 80 for controlling the moving means 402.

The parts 401 and 404 will be described in detail hereunder.

[Counter Electrode Means 401]

As shown in FIGS. 8, 10, 11 and 13, a hollow electrode stand 61 is disposed at the first stage of the base rack 80. A shelllike electrode base 62 formed of epoxy resin so as to be agree with the three-dimensional inside shape of the instrument panel pad 1 is supported on the upper portion of the electrode stand 61 in order to support the instrument panel pad 1 from the inside thereof.

A thin-film counter electrode 63 is formed on the surface of the electrode base 62 corresponding to the inner surface of the instrument panel pad 1 by a suitable coating method, such as a metal plating method, a vacuum evaporating method, a sputtering method, a conductive paint coating method, an aluminum-foil sticking method, or the like, so that contact is made between the surface of the counter electrode 63 and the inner surface of the instrument panel pad 1.

Figure 10:
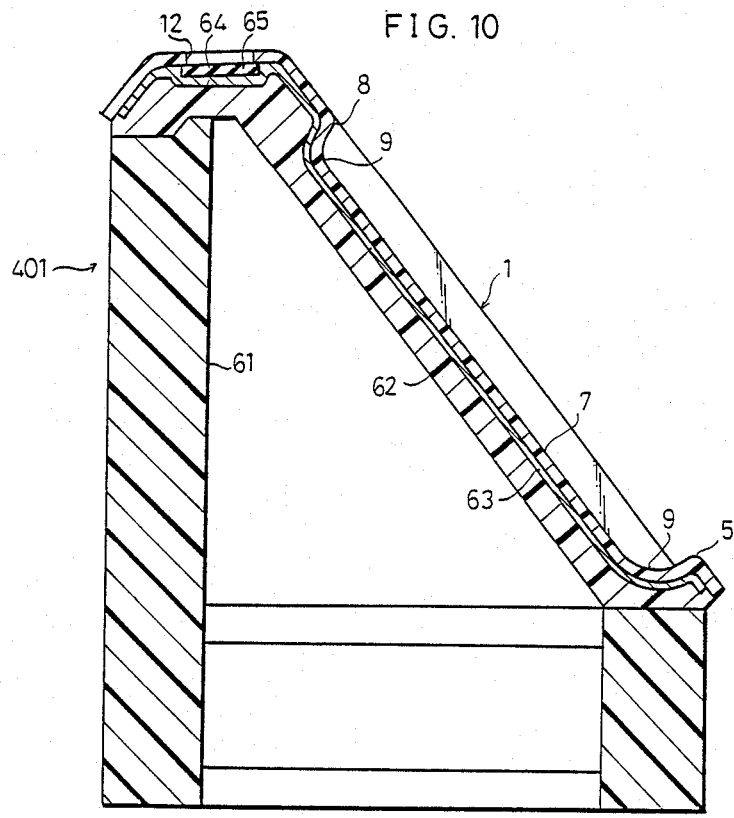
Figure 13:
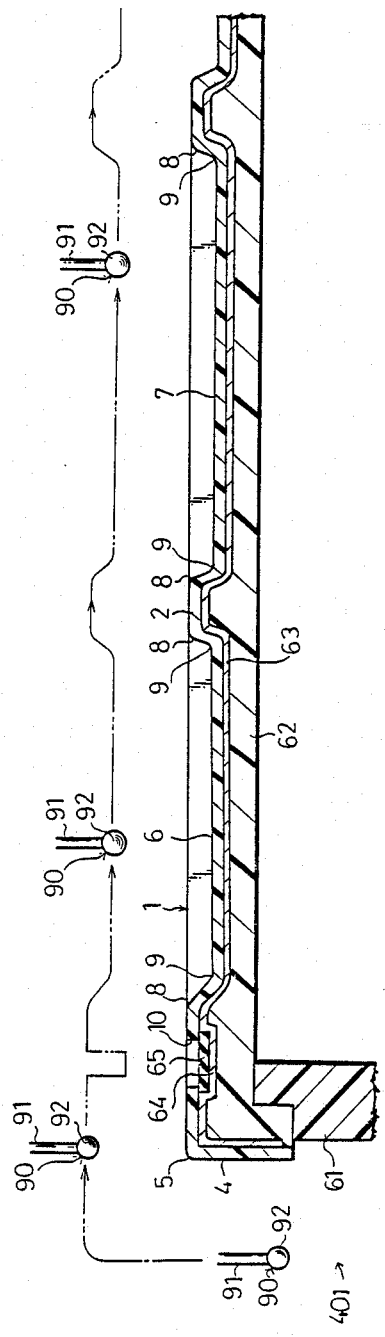

As shown in FIGS. 10 and 13, the electrode base 62 is provided with recess portions 64 formed in positions corresponding to the air-blowing ports 10, 11 and 12 of the instrument panel pad 1, so that the recess portions 64 is coated with the counter electrode 63.

A buffering member 65 made of a dielectric material, such as hyperon rubber, epoxy resin, or the like, is inserted into each of the recess portions 64 to be coated over the counter electrode 63 within the recess portions 64. Accordingly, when a discharge electrode described later is caused to approach the counter electrode 63 to which the instrument panel pad 1 is fitted, it is not apprehended that the counter electrode 63 within the recess portions 64 is exposed to the discharge electrode through the air-blowing ports 10, 11 and 12.

If the counter electrode 63 is exposed to the discharge electrode, corona discharge between the two electrodes may be disturbed or spark discharge may occur.

[Moving Means 402]

Figure 9:
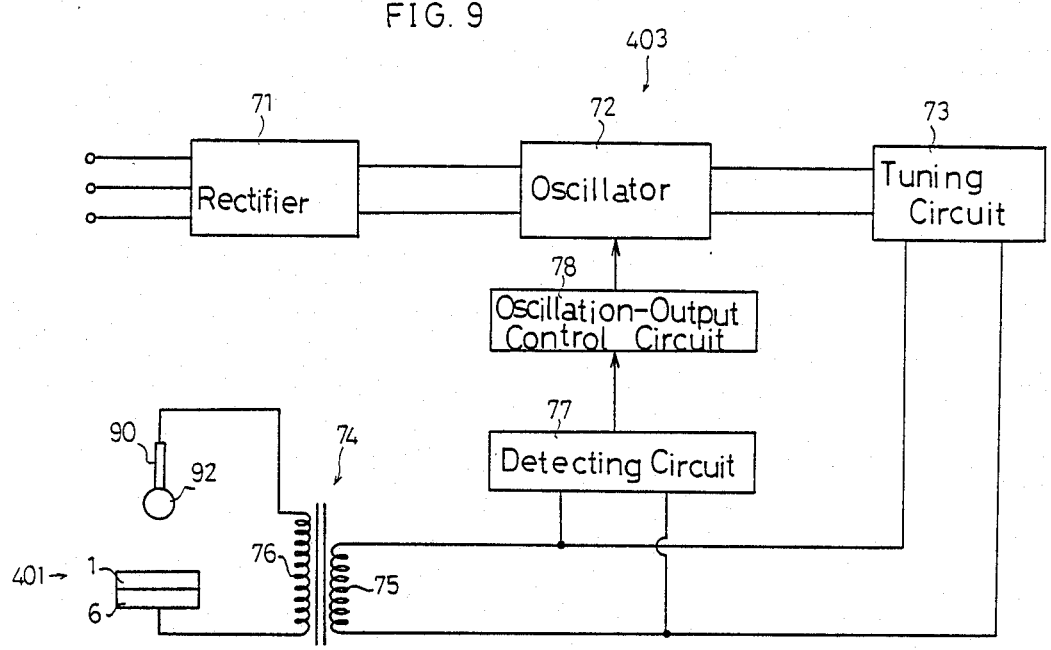
Figure 11:
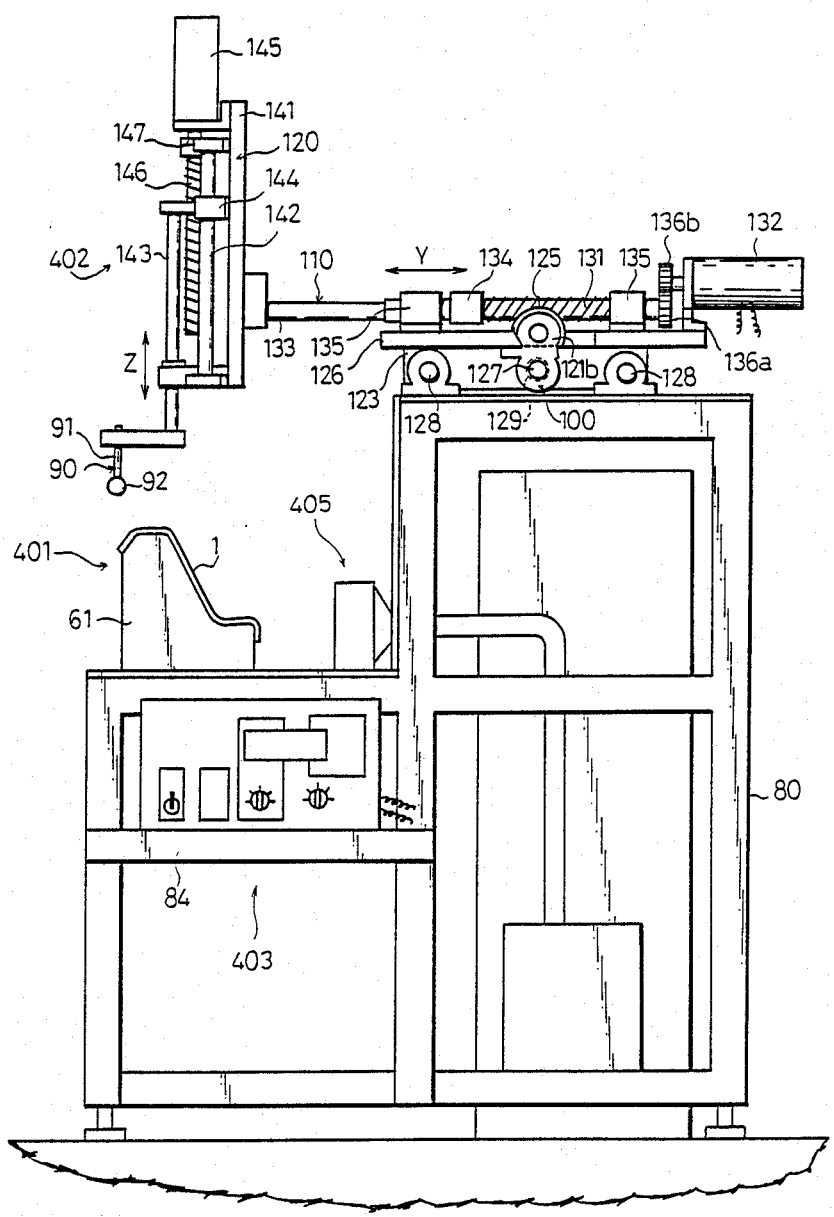
Figure 12:
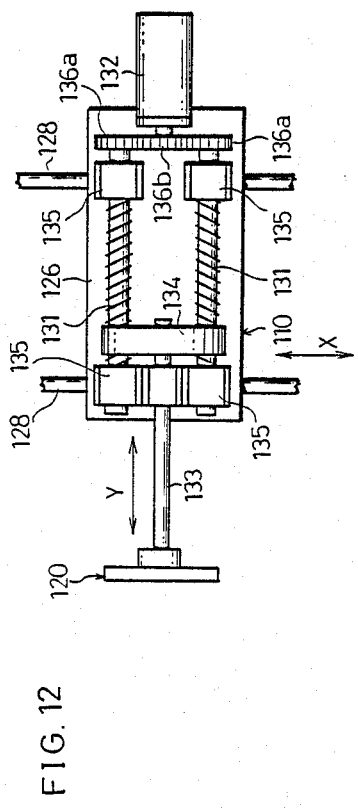

As shown in FIGS. 9, 11 and 12, the moving means 402 is constituted by an X-direction moving means 100 for moving a corona discharge electrode 90 in the direction of the X-axis (in the left/right direction), Y-direction moving means 110 for moving the discharge electrode 90 in the direction of the Y-axis (in the back/forth direction), and Z-direction moving means 120 for moving the discharge electrode 90 in the direction of the Z-axis (in the up/down direction).

In the X-direction moving means 100, two guide rods 128 horizontally extending in parallel to each other are attached to the base rack 80. A turntable 126 for supporting the Y-direction moving means 110 is provided on the guide rods 128 so as to be slidably movable in the direction of the X-axis. That is to say, supports 123 are attached to the lower surface of the turntable 126 and the two guide rods 128 are inserted into the supports 123 to thereby make the turntable 126 slidably movable.

Furthermore, screw joints 129 are attached on the left and right sides of the supports 123 at the lower surface of the turntable 126, and a screw shaft 127 is rotatably and longitudinally displaceably screw-engaged with the screw joints 129. A gear 121$a$ is attached to the right end of the screw shaft 127, and the gear 121$a$ engages with a gear 121$b$ of a servo-motor 125 attached to the right end of the base rack 80.

Accordingly, the screw shaft 127 rotates through the gears 121$a$ and 121$b$ as the servo-motor 125 rotates, so that the turntable 126 moves in the direction of the X-axis together with the screw joints 129 engaged with the screw shaft 127.

In the Y-direction moving means 110, as shown in FIG. 12, two pairs of bearings 135 are provided at the opposite sides of the upper surface of the turntable 126. Two screw shafts 131 extending horizontally parallelly to each other are attached between the respective pairs of right and left bearings 135, the two screw shafts 131 being rotatable but not displaceable longitudinally. Gears 136$a$ are attached on the rear ends of the screw shafts 131 and engaged with a gear 136$b$ of a servo-motor 132 attached to the rear end of the base rack 80.

A screw joint 134 is extended across and screw-engaged with the two shafts 131, and the rear end of a Y-axis arm 133 extending forward is attached to the center of the screw joint 134. The Z-direction moving means 120 is fixed to the front end of the Y-axis arm 133.

Accordingly, also in the Y-direction moving means 110, rotation of the servo-motor 132 is transmitted to the gears 136, the screw shafts 131 and the screw joint 134 in the order, so that the Z-direction moving means 120 can move in the direction of the Y-axis.

In the Z-direction moving means 120, a stationary table 141 is vertically fixed to the front end of the Y-axis arm 133. Two guide rods 142 are fixed on the front surface of the stationary table 141, and the rods 142 vertically extend in parallel to each other.

A sliding member 144 is extended across the two guide rods 142 to be attached thereto, and a female screw portion (not shown) is formed at the center of the sliding member 144. A screw shaft 146 extending upward is screw-engaged with the female screw portion of sliding member 144, and directly connected to a rotary shaft 147 of a servo-motor 145 mounted on the upper portion of the stationary table 141.

On the other hand, a Z-axis arm 143 is fixed at its upper end at the center of the sliding member 144 so as to extend downward therefrom, and the discharge electrode 90 for corona discharge is gripped by the lower end of the Z-axis arm so as to always extend substantially vertically downward.

Accordingly, the screw shaft 146 rotates as the servo-motor 145 rotates, so that the Z-axis arm 143 and discharge electrode 90 are caused to come up/down by the sliding member 144.

The discharge electrode 90 disposed in the air is constituted by a rod-like gripped portion 91 of a diameter of about 2 mm formed of stainless steel, and a spherical discharge top end portion 92 of a diameter of about 6 mm formed of stainless steel and attached to the top end of the gripped portion 91. The gripped portion 91 is gripped by the Z-axis arm 143 as described above so as to be maintained substantially vertically. Accordingly, the gripped portion 91 is not inclined even when moved by the respective moving means 100, 110 and 120.

[High-frequency Energy Applying Means 403]

Figure 8:
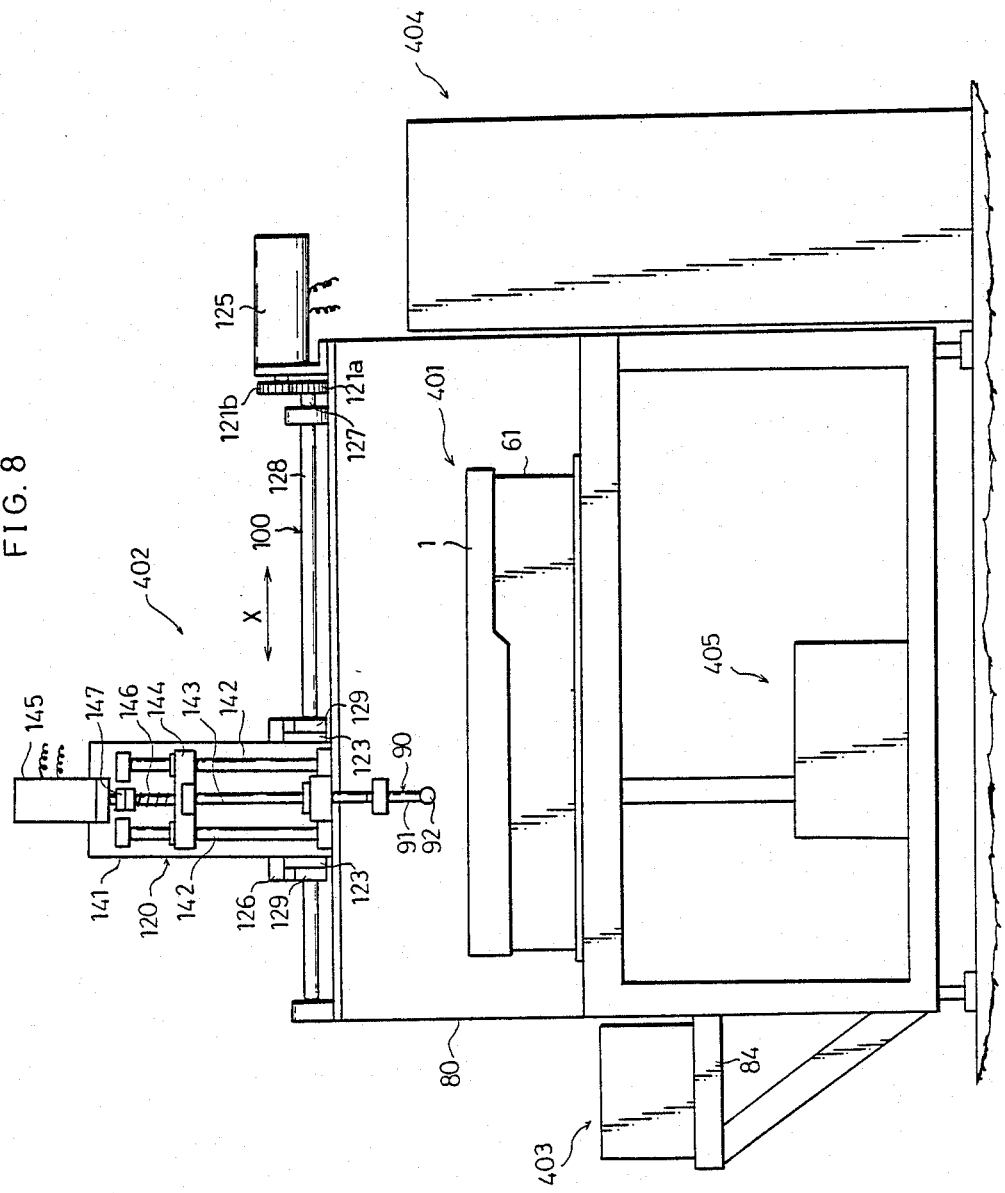
FIG. 8 to FIG. 13 show a second embodiment.

As shown in FIGS. 8 and 9, the high-frequency energy applying means 403 is electrically connected across the counter electrode 63 and the discharge electrode 90.

The arrangement of the high-frequency applying means 403 will be described hereunder.

A rectifier 71 is electrically connected to an input three-phase AC power source. The DC output of the rectifier 71 is connected to an oscillator 72 constituted by an inverter circuit using a thyristor. High-speed switching is made in the oscillator 72 so as to generate a rectangular wave of about 25 kHz.

A tuning circuit 73 is electrically connected to the output of the oscillator 72. The tuning circuit 73 removes harmonic components from the rectangular wave so as to permit a sinusoidal wave of about 25 kHz to pass therethrough.

A primary coil 75 of a high-voltage transformer 74 is electrically connected to the output of the tuning circuit 73, and a secondary coil 76 of the same is connected to both the discharge electrode 90 and the counter electrode 63. The counter electrode side of the secondary coil 76 is grounded.

At the wiring portion between the tuning circuit 73 and the primary coil 75, a detecting circuit 77 for detecting a high-frequency voltage and a high-frequency current impressed to the primary coil 75 is connected in parallel to the primary coil 75. An oscillation-output control circuit 78 is connected between the detecting circuit 77 and the oscillator circuit 72 in order to control the output of the oscillator circuit 72 on the basis of the values of the high-frequency voltage and current detected by the detecting circuit 77.

In the second embodiment, these detecting circuit 77 and the oscillation-output control circuit 78 constitute discharge-output control means for maintaining the discharge output constant regardless of the change in distance between the surface of the instrument panel pad 1 to be treated and the discharge electrode 90

[Control Unit 404]

A control circuit (not shown) using a computer or the like is installed in the control unit 404. The control circuit is taught in advance programs, such as (1) a drive program for controlling the operations of the X-, Y- and Z-direction moving means 100, 110 and 120 to move the discharge electrode while maintaining the distance between the discharge electrode 90 and the surface of the instrument panel pad 1 to be treated substantially constant, and (2) a program for controlling the turning on-off of the high-frequency energy applying means 403, and the like.

As shown in FIG. 11, exhaust means 405 for exhausting gas such as ozone or the like generated during corona discharge treatment is disposed behind the counter electrode means 401 in the rear of the base rack 80.

A corona discharge treating method for an instrument panel pad 1, using the corona discharge treating apparatus having such an arrangement as described above, will be described hereunder.

As shown in FIGS. 8, 10, 11 and 13, the instrument panel pad 1 is fitted to the electrode base 62 and counter electrode 63 of the counter electrode means 401. At this time, the almost whole surface of the counter electrode 63 is brought in direct contact with the whole rear surface of the instrument panel pad 1, because the surface of the counter electrode 63 or the whole thereof is shaped to agree with the three-dimensional shape of the rear side of the instrument panel pad 1.

Accordingly, the instrument panel pad 1 is electrically effectively connected to the counter electrode 63 to thereby make it easy to generate corona discharge from the discharge electrode 90.

Next, after the exhaust means 405 is turned on, the control unit 404 is turned on and each of the X-, Y- and Z-direction moving means 100, 110 and 120 of the moving means 402 is set in a starting position for corona discharge treatment. At this time, the gripped portion 91 of the discharge electrode 90 is supported to always extend vertically, and the discharge top end portion 92 is located above the front edge left end of the instrument panel pad 1 at a distance of about 10 mm therebetween.

Next, upon actuation of the high-frequency energy applying means 403, a rectangular wave of 25 kHz is generated from the oscillator circuit 72 and harmonic components are removed from the rectangular wave in the tuning circuit 73, so that only a sinusoidal wave is allowed to pass through the tuning circuit 73. The sinusoidal wave is raised by the high-voltage transformer 74 so that a high-frequency voltage of 28 kV is produced to be impressed across the counter electrode 63 and the discharge electrode 90. At this time, corona discharge occurs in the air between the upper surface 2 and the opposite portion of the discharge top end portion 92 so as to initiate the corona discharge treatment for the upper surface 2.

The X-, Y- and Z-direction moving means 100, 110 and 120 are moved in the respective directions by the rotations of the servomotors 125, 132 and 145 operated on the basis of the control signal generated from the control unit 404, so that the discharge electrode 90 is moved in the vicinity of the surface of the instrument panel pad 1 to be treated.

The displacement of the discharge electrode 90 is as follows.

(1) First, the discharge electrode 90 is moved right from the left end of the front edge of the instrument panel pad to the right end of the same.

(2) Next, the discharge electrode 90 is moved a little backward so that it is located at the right side of the right side surface 4 of the instrument panel pad 1. Then, the discharge electrode 90 is moved up to a portion above the right end of the front surface 3, moved left to a portion above the left end of the front surface 3, and then moved down to the left side of the left side surface 4 again.

(3) Further, the discharge electrode 90 is moved a little backward, moved upward to a portion above the left end of the upper surface 2, moved right to a portion above the right end of the upper face 2, and the moved downward to the right side of the right side surface 4 again as shown in FIG. 13.

(4) Furthermore, the discharge electrode 90 is reciprocatingly moved while moving backward.

In such displacement of the discharge electrode 90, the distance between the discharge electrode 90 and the surface of the instrument panel pad 1 to be treated is maintained substantially constant, that is, about 10 mm. For example, as shown in FIG. 13, when the discharge electrode 90 passes through over the air-blowing ports 10, 11 and 12 and saucers 6 and 7, the discharge electrode 90 is moved down by the respective depth thereof.

Accordingly, the discharge power output from the discharge electrode 90 is maintained substantially constant with respect to the whole surface of the instrument panel pad to be treated, so that the quality of the treated surface can be improved substantially uniformly.

There is however a possibility of dimensional errors in the instrument panel pad 1 or warp transformation of the same after molding. Accordingly, the distance between the discharge electrode 90 and the surface of the instrument panel pad 1 to be treated may change in practice in spite of the operation of the moving means 402, so that also the discharge power output may be changed more or less in practice.

In this embodiment, however, even if the distance is changed, the detecting circuit 77 and oscillation-output control circuit 78 constituting the discharge-output control means provided for the high-frequency energy applying means 403 can maintain the discharge power output constant in such a manner as follows.

Assuming now that the distance between the discharge electrode 90 and the surface of the instrument panel pad 1 to be treated becomes less than a standard value of 10 mm, the discharge power output between the counter electrode 63 and the discharge electrode 90 becomes more than a standard power output. With the increase of the discharge power output, a high-frequency current flowing in the primary coil 75 of the high-voltage transformer 74 increases. The detecting circuit 77 detects the high-frequency current, so that the oscillation-output control circuit 78 reduces the oscillation power output of the oscillator circuit 72. Accordingly, the discharge power output is controlled to be reduced to the standard power output.

Reversely, assuming that the distance between the discharge electrode 90 and the surface of the instrument panel pad 1 to be treated becomes larger than the standard value 10 mm, the discharge power output becomes less than the standard power output. With the decrease of the discharge power output, the high-frequency current flowing in the primary coil 75 decreases. The detecting circuit 77 detects the high-frequency current, so that the oscillation-output control circuit 78 increases the oscillation power output of the oscillator circuit 72. Accordingly, the discharge power output is controlled to be increased to the standard power output.

The quality of the treated surface of the instrument panel pad 1 can be improved uniformly by corona discharge with the above-mentioned reciprocating motion to thereby improve the adhesive property with respect to painting materials, joining materials, printing materials, etc.

Although the moving speed of the discharge electrode 90 can be suitably set to a value within a range of 1 to 250 mm/sec under the above-mentioned discharge conditions, this embodiment shows the case of 150 mm/sec. According to the moving speed, one instrument panel pad 1 can be treated in about 50 sec.

In addition, this embodiment has the advantage of being free from the influences of changes in potential distribution at the corners 5, 8, 9 and 13 and changes in angles at the treated surface with respect to the direction of discharge due to the shape of the curved surface of the discharge top end portion 92.

It is to be understood that the second embodiment is not limited to the above-described specific arrangement, but changes or modifications may be made as follows.

(1) The X-, Y- and Z-direction moving means 100, 110 and 120 of the moving means 402 may be modified in arrangement or may be replaced by revolute robots or the like.

(2) Although the second embodiment shows the case where the discharge electrode 90 is provided with the moving means 402 for moving the discharge electrode 90, moving means may be provided on the counter electrode means 401 for moving the instrument panel pad 1. In short, any moving means may be used as long as it can move the discharge electrode 90 and the instrument panel pad 1 relative to each other while maintaining the distance between the discharge electrode 90 and the surface of the instrument panel pad 1 to be treated substantially constant.

(3) The discharge-output control means may be modified in arrangement. For example, the discharge-output control means may be made up of detecting means for directly detecting the distance between the discharge electrode 90 and the instrument panel pad 1, and the above-mentioned oscillation-output control circuit 78.

(4) The shape of the discharge top end portion 92 of the discharge electrode 90 is not limited to the spherical one, but any shape, for example, a hemispherical one, a spheroidal one, or the like, can be employed as long as at least the discharge top end portion is shaped to be a curved surface. However, it is considered that the spherical shape is optimum from the point of view of uniformity of corona discharge, particularly from the point of view of uniformity of corona discharge in the case where the discharge electrode is moved without inclination with respect to the surface to be treated as shown in this embodiment.

(5) Furthermore, the discharge electrode 31 can be replaced by a rod-like or plane-like discharge electrode which is moved to approach a surface of the resin molding to be treated in parallel thereto. In the case where the shape of a surface to be treated is simple or a little rough, the use of the rod-like or plane-like electrode is advantageous in more shortening the time required for corona discharge treatment.

In addition, treatment with the discharge electrode 90 according to the embodiment may be suitable combined with treatment with the rod-like or plane-like discharge electrode.

It is to be understood that the present invention is not limited to the first and second embodiments, but changes or modifications may be made as follows.

(1) Although the embodiments show the case where the present invention is applied to an instrument panel pad 1, the invention is applicable to any other three-dimensional resin moldings, such as an automobile bumper, an automobile molding, an autobicycle fender, various types of industrial appliances and home appliances, etc., which need painting, joining, printing or the like after molding.

(2) The discharge portion 55 or discharge top end portion 92 of the discharge electrode 51 or 90 may have a curved surface including concavity and convexity. For example, the concavity may be shaped like a groove or like a hole, and the convexity may be shaped like a semispherical projection. In this case, electric collection is made at the convexity so that an electronic avalanche effect easily generates from the convexity, particularly from the edges thereof to thereby make corona discharge stable and make the range of discharge wide.

(3) The distance between the top end of the discharge electrode 51 or 90 and the surface of the resin molding 1 to be treated may be 50 mm or less, and the relatively moving speed therebetween may be 500 mm/sec or less. In this case, the quality of the surface of the molding 1 can be improved more effectively.

(4) A rod-like nonconductive distance control member which extends toward the surface of the molding 1 to be treated may be mounted to the discharge electrode 51/90 or one of the members connected thereto to thereby maintain the distance between the discharge electrode 51 or 90 and the surface to be treated constant.

As many apparently widely different embodiments of the present invention may be made without departing from the spirit and scope thereof, it is to be understood that the invention is not limited to the specific embodiments thereof except as defined in the appended claims.

What is claimed is:

1. A corona discharge treating method for a three-dimensional resinous article having a hole and a corner, which comprises the steps of:
   (a) providing a rigid corona discharge electrode having a rod-like gripped portion and a spherical discharge portion;
   (b) setting said article on a jig body having a counter electrode and a buffering plate made of a dielectric material on said counter electrode in a postion corresponding to said hole of said article; and
   (c) moving said spherical discharge portion of said corona discharge electrode along a predetermined path along a surface of said article while said spherical discharge portion is generating a corona discharge, said spherical discharge portion being attached to a top end of said rod-like gripped portion of said corona discharge electrode and having a diameter greater than that of said gripped portion.

2. A corona discharge treating method according to claim 1, in which a radius at said spherical discharge portion of said discharge electrode is smaller than a radius at said corner of said three-dimensional resinous article.

3. A corona discharge treating method according to claim 1, in which said discharge electrode is moved relative to said article by moving means for moving said discharge electrode.

4. A corona discharge treating method according to claim 1, in which said article is an automobile instrument panel having a hole and a corner.

5. A corona discharge treating method according to claim 1, which further comprises the step of:
   (c) relatively moving another corona discharge electrode having a rod-like discharge portion along the surface of said article.

6. The corona discharge treating method of claim 1, wherein:
   in step (b), said spherical discharge portion generates a corona discharge through a high-frequency energy applying means connected to the discharge electrode, and the discharge power output from the spherical discharge portion is controlled to be constant regardless of changes in distance between the surface of the article and the spherical discharge portion.

7. A corona discharge treating method according to claim 1, wherein:
   during step (c), said corona discharge electrode is moved with said gripped portion always held in a vertical state.

8. A corona discharge treating method for a three-dimensional resinous article having a hole and a corner, which comprises the steps of:
   (a) providing a rigid corona discharge electrode having a rod-like gripped portion and a spherical discharge portion;
   (b) setting said article on a jig body having a counter electrode and a buffering plate made of a dielectric material on said counter electrode in a position corresponding to said hole of said article; and
   (c) moving said spherical discharge portion of said corona discharge electrode along a predetermined path along a surface of said article while said spherical discharge portion is generating a corona discharge through high-frequency energy applying means connected to said discharge electrode, said spherical discharge portion being attached to a top end of said rod-like gripped portion of said corona discharge electrode and having a diameter greater than that of said gripped portion, a discharge power output from said spherical discharge portion being controlled to be constant regardless of changes in distance between the surface of said article and said spherical discharge portion.

9. A corona discharge treating apparatus for a three-dimensional resinous article having a hole and a corner, which comprises:
   (a) a rigid corona discharge electrode including a rod-like gripped portion and a spherical discharge portion attached to a top end of said rod-like gripped portion, said spherical discharge portion having a diameter greater than that of said gripped portion;
   (b) a jig body for setting said article, said jig body having a counter electrode and a buffering plate made of a dielectric material provided on said counter electrode in a position corresponding to said hole of said article; and
   (c) moving means for three-dimensionally moving said spherical discharge portion along a predetermined path along a surface of said article while said spherical discharge portion is generating a corona discharge.

10. A corona discharge treating apparataus according to claim 9, in which a radius at said spherical discharge portion of said discharge electrode is smaller than a radius at said corner of said three-dimensional resinous article.

11. A corona discharge treating apparatus according to claim 9, which further comprises high-frequency energy applying means for applying high frequency energy to said discharge electrode, and discharge-output control means provided in said high-frequency applying means for keeping a discharge output of said discharge electrode constant even if a distance between the surface of said article and said spherical discharge portion varies.

12. A corona discharge treating apparatus for a resin molding according to claim 11, in which said high-frequency energy applying means includes a high-voltage transformer having a primary coil and a secondary coil electrically connected to said discharge electrode, and an oscillator circuit electrically connected to said primary coil of said high-voltage transformer, and in which said discharge-output control means includes a detecting circuit for detecting a high-frequency voltage and a high-frequency current impressed onto said primary coil of said high-voltage transformer, and an oscillation-output control circuit for controlling an oscillation output of said oscillator circuit on the basis of values detected by said detecting circuit.

13. A corona discharge treating apparatus for a resin molding according to claim 12, in which said high-frequency energy applying means includes a rectifier connected to an input side of said oscillator circuit, and a tuning circuit connected to an out put side of said oscillator circuit and to said primary coil of said high-voltage transformer for removing rectangular harmonic components generated from said oscillator circuit to thereby transmit a sinusoidal wave of substatially fixed frequency.

14. A corona discharge treating apparatus for a resin molding according to claim 11, further comprising a control unit for controlling operations of said moving means and said high-frequency applying means.

15. A corona discharge treating apparatus for a resin molding according to claim 14, further comprising exhaust means for exhausting gas generated in corona discharge treatment.

16. A corona discharge treating apparatus according to claim 9, which further comprises another corona discharge electrode having a rod-like discharge portion.

17. A corona discharge treating apparatus for a resin molding according to claim 9, which further comprising a mesh-like shielding cylinder provided around said discharge electrode to thereby prevent radiation of high-frequency noises produced from said discharge electrode in corona discharge.

18. The corona discharge treating appartus of claim 9, further comprising:
(d) high-frequency energy applying means connected to said discharge electrode for applying high-frequency energy to said discharge electrode for thereby causing a corona discharge through said spherical discharge portion; and
discharge power output control means connected to said discharge electrode for maintaining a constant discharge power output from said spherical discharge portion regardless of changes in distance between the surface of the article and said spherical discharge portion.

19. A corona discharge treating apparatus according to claim 9, wherein said moving means consists of three moving mechanisms, each said moving mechanism moving said spherical discharge portion in one moving direction across the other two moving directions of said other two moving mechanisms so that the three moving mechanisms cooperate so as to three-dimensionally move said spherical discharge portion.

20. A corona treating apparatus according to claim 19, wherein said three moving directions are perpendicular to each other.

21. A corona discharge treating apparataus for a three-dimensional resinous article having a hole and a corner, which comprises:
(a) a rigid corona discharge electrode including a rod-like gripped portion and a spherical discharge portion attached to a top end of said rod-like gripped portion, said spherical discharge portion having a diameter greater than that of said gripped portion;
(b) a jig body for setting said article, said jig body having a counter electrode and a buffering plate made of a dielectric material provided on said counter electrode in a position corresponding to said hole of said article;
(c) high-frequency energy applying means connected to said discharge electrode and for applying high-frequency energy to said discharge electrode thereby causing a corona discharge through said spherical discharge portion;
(d) moving means for three-dimensionally moving said spherical discharge portion along a predetermined path along a surface of said article while said spherical discharge portion is generating the corona discharge; and
(e) discharge power output control means connected to said discharge electrode and for maintaining constant a discharge power output from said spherical discharge portion regardless of changes in distance between the surface of said article and said spherical discharge portion.

* * * * *